United States Patent
Owen et al.

(10) Patent No.: US 11,023,874 B2
(45) Date of Patent: *Jun. 1, 2021

(54) N TO N MONEY TRANSFERS

(71) Applicant: The Western Union Company, Englewood, CO (US)

(72) Inventors: David A. Owen, Castle Rock, CO (US); Michael Michelsen, Arvada, CO (US); Kurt Bulawa, Parker, CO (US); Michele Demark, Highlands Ranch, CO (US)

(73) Assignee: The Western Union Company, Denver, CO (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/415,976

(22) Filed: May 17, 2019

(65) Prior Publication Data

US 2019/0272523 A1 Sep. 5, 2019

Related U.S. Application Data

(63) Continuation of application No. 14/742,217, filed on Jun. 17, 2015, now Pat. No. 10,354,245, which is a continuation of application No. 12/841,333, filed on Jul. 22, 2010, now abandoned.

(51) Int. Cl.
| | |
|---|---|
| *G06Q 40/00* | (2012.01) |
| *G06Q 20/22* | (2012.01) |
| *G06Q 20/10* | (2012.01) |
| *G06Q 20/40* | (2012.01) |

(52) U.S. Cl.
CPC ............ *G06Q 20/29* (2013.01); *G06Q 20/10* (2013.01); *G06Q 20/405* (2013.01); *G06Q 40/00* (2013.01)

(58) Field of Classification Search
CPC ......... G06Q 20/10; G06Q 40/00; G06Q 40/02
See application file for complete search history.

(56) References Cited

U.S. PATENT DOCUMENTS

| | | | |
|---|---|---|---|
| 5,517,406 A | 5/1996 | Harris et al. | |
| 5,909,794 A | 6/1999 | Molbak et al. | |
| 5,930,778 A | 7/1999 | Geer | |
| 6,012,048 A | 1/2000 | Gustin et al. | |

(Continued)

FOREIGN PATENT DOCUMENTS

WO 0199069 12/2001

*Primary Examiner* — Mike Anderson
(74) *Attorney, Agent, or Firm* — Kilpatrick Townsend & Stockton, LLP

(57) ABSTRACT

Various methods, systems, and devices are described for performing money transfers to one or more payees from one or more payors using a money transfer system. A party, such as a payor, a payee, or a third party may create a set of payee rules. The same or a different party may also create a set of payor rules. The payee rules may comprise conditions which, when satisfied, permit a payee to receive funds from a funds pool. The payor rules may comprise conditions which, when satisfied, permit a payor to provide funds to the funds pool. The money transfer system may determine whether requests from a payor and a payee comply with the payor rules and the payee rules, respectively. Based on the determination, the payor and/or payee may be permitted to complete their requested transaction, or their transaction may be denied.

20 Claims, 9 Drawing Sheets

(56) References Cited

U.S. PATENT DOCUMENTS

| | | |
|---|---|---|
| 6,182,891 B1 | 2/2001 | Furuhashi et al. |
| 6,311,170 B1 | 10/2001 | Embrey |
| 6,748,367 B1 | 6/2004 | Lee |
| 7,376,587 B1 * | 5/2008 | Neofytides ............ G06Q 20/02 |
| | | 705/26.35 |
| 7,644,037 B1 | 1/2010 | Ostrovsky |
| 7,680,738 B2 | 3/2010 | Amann et al. |
| 8,082,210 B2 | 12/2011 | Hansen et al. |
| 10,354,245 B2 | 7/2019 | Owen et al. |
| 2002/0032651 A1 | 3/2002 | Embrey |
| 2002/0073026 A1 | 6/2002 | Gruber et al. |
| 2002/0080175 A1 | 6/2002 | Hautt et al. |
| 2002/0111908 A1 * | 8/2002 | Milberger ............... G06Q 20/10 |
| | | 705/44 |
| 2002/0116331 A1 * | 8/2002 | Cataline ................. G06Q 30/06 |
| | | 705/39 |
| 2002/0152161 A1 | 10/2002 | Aoike |
| 2002/0152176 A1 * | 10/2002 | Neofytides ............ G06Q 20/04 |
| | | 705/64 |
| 2003/0014300 A1 | 1/2003 | Franco et al. |
| 2003/0130948 A1 * | 7/2003 | Algiene ................. G06Q 20/04 |
| | | 705/44 |
| 2003/0135459 A1 * | 7/2003 | Abelman ............. G06Q 20/102 |
| | | 705/40 |
| 2003/0220886 A1 | 11/2003 | Lam et al. |
| 2004/0143552 A1 * | 7/2004 | Weichert ................ G06Q 20/00 |
| | | 705/64 |
| 2005/0091161 A1 | 4/2005 | Gustin et al. |
| 2006/0206419 A1 * | 9/2006 | Rosti ...................... G06Q 20/10 |
| | | 705/39 |
| 2008/0015989 A1 * | 1/2008 | Steiger, Jr. ........... G06Q 30/018 |
| | | 705/44 |
| 2008/0140568 A1 | 6/2008 | Henry |
| 2008/0172342 A1 | 7/2008 | Keane et al. |
| 2009/0106149 A1 * | 4/2009 | Bennett ................ G06Q 20/108 |
| | | 705/42 |
| 2010/0114749 A1 | 5/2010 | Burras et al. |
| 2011/0010277 A1 | 1/2011 | Enzaldo |
| 2012/0023008 A1 | 1/2012 | Owen et al. |
| 2015/0371209 A1 | 12/2015 | Owen et al. |

\* cited by examiner

N TO N MONEY TRANSFERS

RELATED APPLICATIONS

The present application claims priority to and is a continuation of U.S. patent application Ser. No. 14/742,217, filed Jun. 17, 2015, and entitled "N TO N MONEY TRANSFERS," which is a continuation of U.S. patent application Ser. No. 12/841,333, filed Jul. 22, 2010, and entitled "N TO N MONEY TRANSFERS," the entire contents of which are incorporated by reference herein for all purposes.

BACKGROUND OF THE INVENTION

A person or other entity (collectively referred to as a party) may desire to send money to multiple other parties. Typically, this may involve the party conducting multiple money transfer transactions. Each of these money transfer transactions may need to be conducted independently from each other. Further, each of these transactions may involve the party sending funds to repeatedly provide the same pieces of information necessary to conduct each money transfer transaction.

Further, multiple parties may desire to send money to the same party. Again, such a situation may require each money transaction to be conducted independently from each other. Each of these transactions may involve the party sending the funds to repeatedly provide the same or substantial similar pieces of information necessary to conduct each money transfer transaction.

Additionally, because money transfer transactions typically are one-to-one transactions, that is, one party to one other party, it may not be possible for a party to define various conditions under which some other party is permitted to participate or be denied from participating in the money transfer transaction.

BRIEF SUMMARY OF THE INVENTION

Various systems, methods, and devices are described for multiple parties to one party money transfer transactions, one party to multiple parties money transfer transactions, and multiple parties to multiple parties money transfer transactions. Such arrangements may allow for money transfer transactions to be conducted that include multiple payors (parties sending money to one or more other parties), multiple payees (parties receiving money from one or more other parties), or both.

Besides allowing for multiple payors, multiple payees, or both to participate in linked money transfer transactions, various rules may be established that determine how payees and/or payors may participate in the money transfer transactions. Such rules may be established by a payor, payee, or a third party. These rules may include rules such as: whether or not a party may serve as a payor, whether or not a party may serve as a payee, maximum and/or minimum amounts of funds individual payors are permitted to contribute, maximum and/or minimum amounts of funds that individual payees are permitted to receive, and various permissible payment (both from the payor and to the payee) methods. Further, some rules may establish conditions contingent on behavior by other payors and payees. For example, a rule may establish that a first payee may only receive half of the funds received by a second payee. Another example may be that a first payor is only permitted to contribute funds after a second payor has contributed an amount of funds.

In some embodiments, a method for performing money transfers to a plurality of payees from a payor using a money transfer system is present. The method may include receiving a set of payee rules from the payor. The payee rules may identify each payee of the plurality of payees. The payee rules may comprise conditions which, when satisfied, permit each payee of the plurality of payees to receive funds from a funds pool. The payee rules may comprise conditions that define an amount of funds that each payee of the plurality of payees is permitted to receive from the funds pool. The method may include storing the set of payee rules. The method may include receiving funds from the payor, wherein access to the funds by the plurality of payees is determined using the set of payee rules. The method may include linking the funds received from the payor to the funds pool. The method may include receiving a first request for funds from the funds pool from a first payee of the plurality of payees. The method may include determining whether the first request complies with a first subset of conditions comprising the set of payee rules. The method may include providing a first amount of funds from the funds pool to the first payee. The method may include receiving a second request for funds from the funds pool from a second payee of the plurality of payees. The method may include determining whether the second request complies with a second subset of conditions comprising the set of payee rules. The second subset of conditions may comprise at least one condition different from the conditions in the first subset of conditions. Also, the method may include providing a second amount of funds to the second payee.

In some embodiments, the set of payee rules defines how much of the funds from the funds pool received from the payor each payee of the plurality of payees is permitted to receive. In some embodiments, the payee rules limit the second amount of funds provided to the second payee at least partially based on the first amount of funds provided to the first payee. The first request for funds may identify a requested amount of funds. The method may include determining that the first request complies with the first subset of conditions of the payee rules and further comprises determining whether the requested amount of funds complies with the first subset of conditions of the payee rules. In some embodiments, the method may include receiving following the second amount of funds being provided to the second payee, additional funds from the payor. The method may also include receiving from the payor, an indication that the payee rules apply to the additional funds received from the payor. In some embodiments, the set of payee rules may define percentages that determine amount of funds from the funds pool permitted to be provided to each of the plurality of payees. In some embodiments, the money transfer system may comprise a plurality of agent locations. The first amount of funds may be provided to the first payee in cash at a first agent location. The second amount of funds may be provided to the second payee in cash at a second agent location. The first agent location and the second agent location might be physically separate agent locations.

In some embodiments, a method for performing money transfers from a plurality of payors to a payee using a money transfer system may be present. The method may include receiving a set of payor rules from the payee, wherein the payor rules comprise conditions that identify circumstances in which the plurality of payors is permitted to provide funds to a funds pool. The method may include storing the set of payor rules. The method may include receiving a first request to provide funds to the funds pool from a first payor of the plurality of payors to the payee. The method may include determining whether the first request complies with the set of payor rules. The method may include receiving funds from the first payor. The funds may be received following the determination that the first request complies with the set of payor rules. The method may include linking the funds received from the first payor to the funds pool. The method may include receiving a second request to provide funds to the funds pool from a second payor of the plurality of payors to the payee. The method may include determining whether the second request complies with the set of payor rules. The method may include receiving funds from the second payor, wherein the funds are received following the determination that the second request complies with the set of payor rules. Also, the method may include linking the funds received from the second payor to the funds pool.

In some embodiments, a method for performing money transfers to a plurality of payees from a plurality of payors using a money transfer system is presented. The method may include receiving a set of payee rules from a master party. The payee rules may identify each of the plurality of payees. The payee rules may identify circumstances in which each payee of the plurality of payees is permitted to receive funds from a funds pool. The payee rules may identify circumstances that define an amount of funds that each payee of the plurality of payees is permitted to receive from the funds pool. The method may include storing the set of payee rules. The method may include receiving a set of payor rules from the master party. The set of payor rules may identify circumstances in which each payor of the plurality of payors is permitted to provide funds to the funds pool. The method may include storing the set of payor rules. The method may include receiving a first request to provide a first amount of funds from a first payor of the plurality of payors to the funds pool. The method may include determining the first request complies with the set of payor rules. The method may include receiving the first amount of funds from the first payor, wherein the first amount of funds is received following the determination that the first request complies with the set of payor rules. The method may include linking the first amount of funds to the funds pool. The method may include receiving a second request to provide a second amount of funds from a second payor of the plurality of payors to the funds pool. The method may include determining the second request complies with the set of payor rules. The method may include receiving the second amount of funds from the second payor, wherein the second amount of funds is received following the determination that the second request complies with the set of payor rules. The method may include linking the second amount of funds to the funds pool. Further, the method may include receiving a first request for funds from the funds pool, the first request received being from a first payee of the plurality of payees. The method may include determining the first request complies with the set of payee rules. The method may include providing a third amount of funds to the first payee from the funds pool. The method may include receiving a second request for funds from the funds pool, the second request received being from a second payee of the plurality of payees. The method may include determining the second request complies with the set of payee rules. Further, the method may include providing a fourth amount of funds to the second payee from the funds pool.

BRIEF DESCRIPTION OF THE DRAWINGS

In the appended figures, similar components and/or features may have the same reference label. Further, various components of the same type may be distinguished by following the reference label with a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Various systems, methods, and devices are described for money transfer transactions that allow for the transactions to occur: from multiple parties to one party, from one party to multiple parties, and from multiple parties to multiple parties (collectively referred to as N to N money transfers). Besides allowing for multiple payors, multiple payees, or both to participate in the same money transfer transaction (or linked money transfer transactions), various rules may be established that determine how payees and/or payors may participate in the money transfer transaction. Such rules may be established by a payor, a payee, or a third party. These rules may allow for the party initiating the money transfer transaction (possibly a payor, payee, or third party) to define various rules that govern how and when other payors and payees may provide funds to or receive funds from a funds pool. These rules may include rules such as: whether or not a party may serve as a payor, whether or not a party may serve as a payee, maximum and/or minimum amounts of funds individual payors are permitted to contribute, maximum and/or minimum amounts of funds that individual payees are permitted to receive, and various permissible payment (both from the payor and to the payee) methods. Further, some rules may establish conditions contingent on behavior by other payors and payees. For example, a rule may establish that a first payee may only receive half of the funds received by a second payee.

Figure 1:
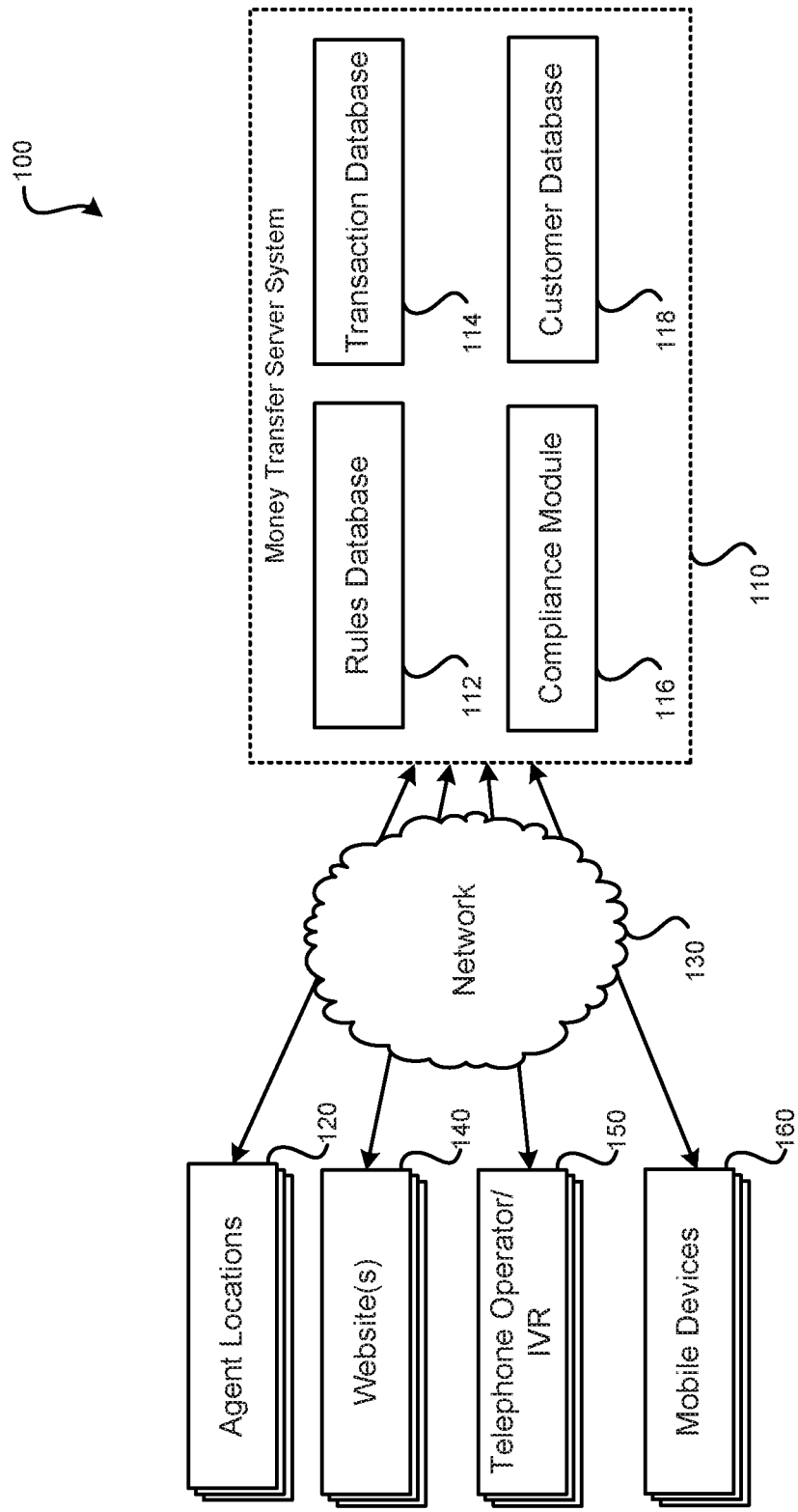
FIG. 1 illustrates a simplified block diagram of an embodiment of a money transfer system.

FIG. 1 illustrates a simplified embodiment 100 of a money transfer system 100. Such a money transfer system may be operated by an entity such as WESTERN UNION and may be capable of performing a variety of money transfer transactions from payors to payees. For example, money transfer system 100 may be capable of performing wire transfers and bill payment transactions. Other services may include the ability to issue and reload prepaid stored value cards with funds, and the ability to send gift cards to a party (and reload such cards with funds). A wire transfer may be made from one party to another party, and may involve cash being transferred. Money transfer system 100 may include one or more agent locations 120, one or more websites 140, telephone operator and/or interactive voice response (IVR) systems 150, mobile devices 160, a money transfer server system 110, a rules database 112, a transaction database 114, a compliance module 116, and/or a customer database 118.

Agent locations 120 may represent various kiosks and/or other physical locations where payors and payees may conduct money transfer transactions. For example, WESTERN UNION may have hundreds of thousands of agent locations scattered worldwide. At agent locations 120, a person, such as a clerk, may serve as a representative of the entity providing the money transfer service. Payors and payees may conduct money transfer transactions by interacting directly with an agent of the money transfer entity at an agent location. Transactions conducted at an agent location may be conducted using a variety of different payment methods. For example, cash, checks, credit cards, debit cards, and stored value cards are all possible methods through which a payment may be received from a payor or provided to a payee. Also, at an agent location, payors and payees may interact directly with a kiosk that is part of the money transfer system 100. Alternatively, the agent of the money transfer service provider may interact with the kiosk on behalf of the payor or payee.

Money transfer system 100 may include one or more websites. Such websites may allow payors and payees to conduct money transfer transactions via the Internet. A payor may provide payment and transaction information to money transfer system 100 via website 140. For example, a payor may provide bank account information or credit card information to money transfer system 100 via website 140. Likewise, payees may receive payment sent via money transfer system 100 via website 140. For example, it may be possible for a payee to provide a bank account number for funds to be deposited via website 140. Website 140 may also permit a payor or payee to determine the status of a money transfer transaction. If a payor is conducting the money transfer using a bank account, credit card, stored value card, or using some other payment method besides cash, he may be able to conduct the entire payor-side transaction using the website 140. Likewise, if the payee is receiving the funds via a method other than cash, he may be able to complete his payee-side transaction using website 140. Alternatively, if either the payor and payee is conducting the transaction in cash, some of the information necessary to conduct the money transfer transaction may be supplied via website 140, with the cash being transacted at an agent location of agent locations 120.

Money transfer system 100 may also include a telephone operator and/or interactive voice response (IVR) system 150. Telephone operator and/or IVR system 150 may allow a payor and/or payee to conduct the money transfer transaction via a telephone call to the telephone operator and/or IVR system 150. Payors and payees may provide the information necessary to conduct the money transfer transaction via the telephone, either to a human operator, or to an interactive voice response system. If a payor is conducting the money transfer using a bank account, credit card, stored value card, or using some other payment method besides cash, he may be able to completely conduct the transaction using the telephone operator and/or IVR system 150. Likewise, if the payee is receiving the funds via a method other than cash, he may be able to complete the transaction using the telephone operator and/or IVR system 150. Alternatively, if either the payor and payee is conducting the transaction in cash, some of the information necessary to conduct the money transfer transaction may be supplied via the telephone operator and/or IVR system 150, with the cash being transacted at an agent location of agent locations 120.

Also, it may be possible to interact with money transfer system 100 via mobile devices 160. Mobile Device 160 may represent various wireless devices that can communicate with money transfer system 100. For example, Mobile Device 160 may include cellular telephones, smart phones, laptops, tablet computers, etc. Mobile devices 160 may load a website to interact with money transfer system 100. Alternatively, mobile devices 160 may run one or more pieces of software, such as applications or firmware configured to allow interaction with money transfer system 100. Via mobile devices 160, it may be possible for a payor to transmit funds to a payee. Also, it may be possible for a payee to receive funds via mobile devices 160. If a payor is conducting the money transfer using a bank account, credit card, stored value card, or using some other payment method besides cash, he may be able to complete the transaction using a mobile device of mobile devices 160. Likewise, if the payee is receiving the funds via a method other than cash, he may be able to complete the transaction using a mobile device of mobile devices 160. Alternatively, if either the payor and payee is conducting the transaction in cash, some of the information necessary to conduct the money transfer transaction may be supplied via a mobile device of mobile devices 160, with the cash being transacted at an agent location of agent locations 120.

Agent locations 120, website 140, telephone operator and/or IVR system 150, and mobile devices 160 may communicate with money transfer server system 110 via a network 130. Network 130 has been represented as a single network in FIG. 1. This is for simplicity only, network 130 may include several networks. Further, the network used for agent locations 120 to communicate with money transfer server system 110 may be different from the network used by mobile devices 160 to communicate with money transfer server system 110. The network 130 may include one or more public networks, such as the Internet, and one or more private networks, such as a corporate intranet. Further, multiple networks may be used to communicate with money transfer server system 110. For example, mobile devices 160 may use a wireless cellular provider's network and the Internet to communicate with money transfer server system 110.

Whether a payor provides funds to the money transfer system 100 via agent locations 120, website 140, telephone operator and/or IVR system 150, or mobile devices 160, this may not affect how a payee may receive the funds. For example, while a payor may provide funds via website 140, a payee may retrieve the funds via one of agent locations 120. It may also be possible for a payor to use the same entity, such as agent locations 120, to conduct a money transfer transaction.

Money transfer server system 110 may include one or more various subsystems used to conduct a money transfer transaction. For example, a customer database 118 may be present. Customer database 118 may store biographical information about the money transfer service provider's customers (payors and payees).

Transaction database 114 may store information on pending and completed money transfer transactions. Transaction database 114 may identify amounts of funds provided by payors, amounts of funds due to payees, payors' names, the payees' names, transaction identifiers such as money transfer control numbers (MTCNs), the locations where the transactions were initiated (e.g., the website, an address of the agent location), the location of where the transaction is expected to be completed (e.g., where the payee is expected to receive the funds), the payor's payment method (e.g., cash, credit card, money order, stored value card, check, etc.), and whether or not various money transfer transactions have been completed or are pending.

Compliance module 116 may be used to ensure compliance with government regulations. For example, the money transfer service provider operating the money transfer system 100 may be required to comply with various government regulations (possibly varying by country) intended to prevent fraudulent and/or illegal use of money transfer systems. An example of a compliance measure that the money transfer service provider may use is a list of persons that the money transfer service provider is prohibited from doing business with published by the Office of Foreign Asset Control (OFAC). The money transfer service provider may be required by law to not do business with (e.g., as a payor or payee) persons published on such a list. Other compliance measures may include gathering additional information about payors and payees conducting a money transfer that exceeds a particular amount and/or is international. Money transfer transactions being conducted with cash may also include additional compliance measures. Therefore, depending on the location of the payor and payee, the amount of the money transfer, and the payment method, each money transfer may be subject to varying levels of examination and regulation by compliance module 116.

Rules database 112 may store rules provided by payors, payees and/or third parties that place conditions on how various money transfer transactions may be conducted. Various rules stored in rules database 112 may be flexible. For example, payors, payees, and/or third parties may be provided with a variety of different options of how rules may be defined. Such rules may determine who may serve as a payor and/or payee. Such rules may also define minimum and/or maximum amounts or percentages of funds that payors may provide and/or payees may receive. Various other conditions may also be possible, such as the order in which multiple payors may provide funds, or various payees may receive funds. Further, the rules may only allow various actions by payors and/or payees based on actions of other payors and/or payees. For example, a second payor may be required to provide a minimum of double what a first payor provided. Additional detail on various rules which may be present in rules database 112 will be discussed herein.

Figure 2:
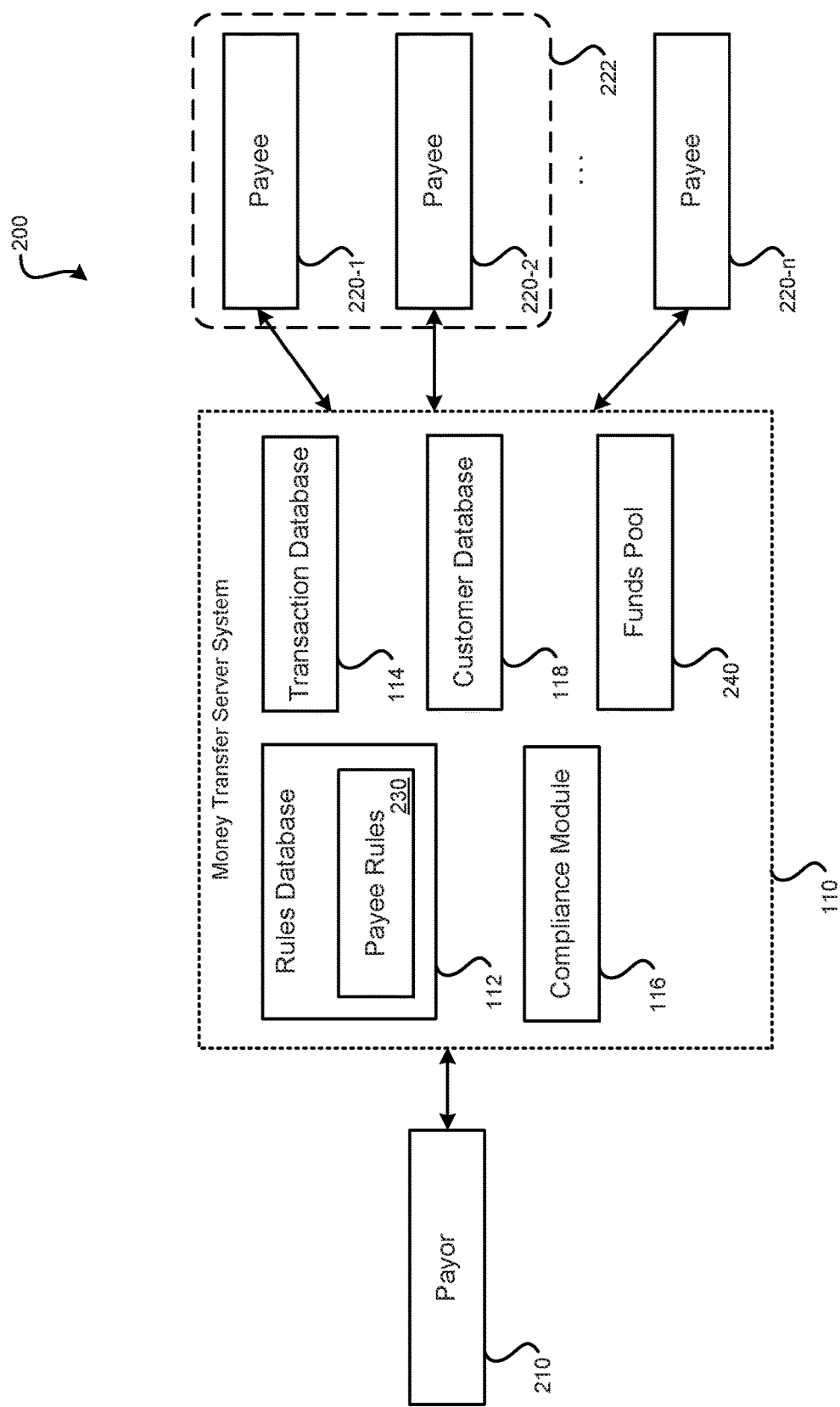
FIG. 2 illustrates a simplified block diagram of an embodiment of a one-to-many money transfer system.

Money transfer system 100 may be used by payors, payees, and third parties to conduct money transfer transactions from a single payor to multiple payees. FIG. 2 illustrates a simplified block diagram of an embodiment 200 of a payor 210 transferring funds to multiple payees 220. In embodiment 200, payees 220-1, 220-2, and 220-n are present. This is intended to illustrate that the number of payees 220 may vary. Embodiments may include two payees, while other embodiments may include dozens of payees.

FIG. 2 illustrates payor 210 and payees 220 interacting directly with money transfer server system 110. This is for simplicity only. Referring back to FIG. 1, payor 210 and payees 220 may interact with money transfer server system 110 via agent locations 120, website(s) 140, telephone operator and/or IVR system 150, and/or mobile devices 160. In embodiment 200, a single payor, payor 210, is sending funds to multiple payees 220. This may involve payor 210 conducting one transaction with money transfer server system 110. This transaction may specify all of the biographical information about the payor necessary for a typical money transfer transaction, such as her name, home address, and/or phone number. The payor may also be required to provide a signature, present a picture identification (e.g., driver's license, government issued identification card, passport, etc.) to verify her identity. Such identification information may only need to be provided once, despite multiple payees being intended as recipients for funds.

Funds pool 240 may store the funds provided by payor 210. These funds may be intermingled with funds provided by other payors for other transactions. Alternatively, funds pool 240 may contain funds maintained separate from funds submitted by other payors. An indication of the amount of funds in funds pool 240 may be stored in transaction database 114. The funds provided by payor 210 may be linked with payee rules 230 provided by payor 210. While funds pool 240 is illustrated as part of the money transfer server system 110, funds pool 240 may reside at a third-party institution, such as a bank.

Rules database 112 of money transfer server system 110 may comprise a set of payee rules 230. Payee rules 230 may define various restrictions defined by payor 210 (or some other authorized third party) that govern: 1) who may serve as a payee; 2) when each payee may receive funds; 3) how much funds each payee may receive; 4) how many times and/or how often a payee may receive funds, and/or other conditions. Payee rules 230 may be linked to the transaction and funds supplied by payor 210.

Referring to point one, payor 210 may restrict who may serve as payees 220 via payee rules 230. This may involve payor 210 providing names, addresses, phone numbers, user names, etc. of payees 220. The payor may also provide as a payee rule that if a particular party receives funds as a payee, some other party may or may not serve as a payee. Such an arrangement may be useful if payor 210 wishes to send an amount of money to a family, and wishes to allow several members of the family to be able to access the money, but not if someone in the family has already claimed some or all of the funds.

Referring to point two, payor 210 may define rules that define when each payee specified in point one may access funds. These payee rules 230 may involve payor 210 selecting a range of dates and/or times that permit one or more payees to receive funds. Another payee rule that payor 210 may set is that a payee is only permitted to receive funds after some other predetermined condition has occurred, such as: some other payee has received funds or a certain amount of funds of the funds pool 240 has been received by other payees.

Referring to point three, payor 210 may define payee rules that define how much funds each payee of payees 220 or payees 220 collectively are permitted to receive. Of course, the amount of funds that payees 220 may receive may also be limited by the amount that payor 210 has provided to money transfer server system 110. Payor 210 may specify fixed maximum and/or minimum amounts that payees 220 are permitted to receive. Payor 210 may also specify percentages that identify amounts of the funds provided by payor 210 to funds pool 240 that each of payees 220 are permitted to receive. For example, a payor may provide $100 and specify that each payee of payees 220 may receive 33%. Therefore, each payee of payees 220 may receive roughly $33. Alternatively, payor 210 may specify a different percentage for each payee of payees 220. For example, payor 210 may define a payee rule that states that payee 220-1 is to receive 60%, payee 220-2 is to receive 30%, and payee 220-n is to receive 10%.

Referring to point four, payor 210 may also define how many times and/or how often a payee of payees 220 is permitted to receive funds. If payor 210 provides an amount of funds to money transfer server system 110, this amount of funds may remain with money transfer server system 110 until all of the funds provided by payor 210 have been received by payees or payor 210. Payor 210 may specify that payees 220 or particular payees are not permitted to conduct more than one money transfer transaction to receive funds per some period of time, such as once per week. This may be particularly useful if the funds pool provided by payor 210 has a large amount of funds in it and is intended to be slowly distributed to payees 220 over a period of time. Payor 210 may also define the number of times each of payees 220 is permitted to receive funds. For example, payor 210 may allow payees to receive as much funds from funds pool 240 as each payee desires, but are only allowed to receive funds twice. Payor 210 may also define specific uses for the funds that the payee may complete. For example, payor 210 may specify that payees 220 may only complete bill payment with the funds or directly transfer the funds to specific retailers or types of retailers.

Payor 210 may also restrict the geographic location in which a payee may receive funds and/or the method through which payees may receive funds. For example, payee rules 230 may prevent payees from receiving funds while in a foreign country or in a resort area. Payor 210 may be able to define specific agent locations payee must receive funds at. Payor 210 may also restrict the payment method used by payees 220. For example, payor 210 may require that payees 220 receive funds directly into a bank account, or in cash at an agent location. Payor 210 may also specify that the funds received by payees be used directly for bill payment transactions through money transfer server system 110.

As should be understood by those with skill in the art, payee rules 230 may be set by payor 210 to apply to all of payees 220 or to individual payees of payees 220. Further, while the above discusses payor 210 setting payee rules 230, it should be understood that payor 210 may delegate payee rules 230 to be set by some third party. Table 1 illustrates an example of a set of payee rules 230 payor 210 (or some third party) may set to govern how payees 220 receive funds.

payee 220-2 because of the limit set on group 222. Payee 220-n, because he is not a member of group 222, may not be subject to the $100 limit imposed on group 222.

Moreover, payee rules 230 may apply to one or more amounts of funds provided by payor 210. Payor 210 may set up payee rules 230 to apply to a first amount of funds that payor 210 wishes to provide to payees 220. After some or all of the funds have been disbursed to payees 220, payee rules 230 may be retained for use as a template for future transactions to payees 220 or some other payees. This may allow payor 210 at some future time to provide additional funds and to specify that payee rules 230 again apply. As should be understood, using any of the access methods discussed in relation to FIG. 1 (agent locations 120, websites 140, telephone operator and/or IVR system, and/or mobile devices 160), payor may create and/or modify payee rules 230.

If a payee of payees 220 attempts to receive funds using money transfer server system 110 and the payee's request satisfies all applicable payee rules 230, the payee may receive the funds. If the payee's request does not satisfy all applicable payee rules 230, the payee may be informed of what rule was not satisfied. Alternatively, payor 210 may desire some or all payor rules 230 remain secret. As such, the payee may not be made aware as to why her request for funds did not satisfy payee rules 230.

Figure 3:
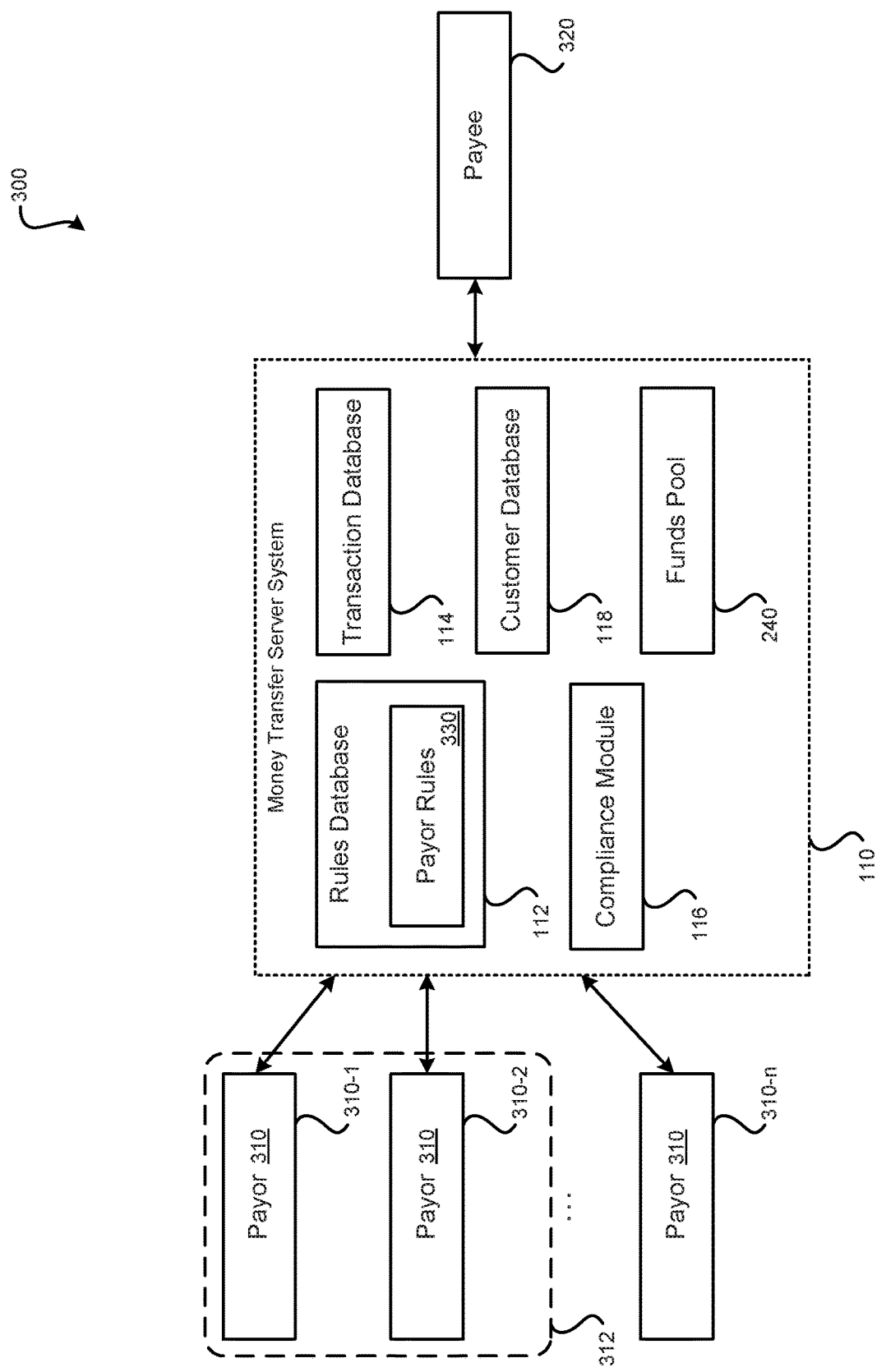
FIG. 3 illustrates a simplified block diagram of an embodiment of a many-to-one money transfer system.

While FIG. 2 illustrates a one payor to multiple payee arrangement, FIG. 3 illustrates a simplified block diagram of an embodiment 300 of multiple payors 310 transferring funds to a single payee 320. Embodiment 300 may also use the money transfer server system 110. However, as opposed to storing a set of payee rules, money transfer server system 110 may store a set of payor rules 330. In embodiment 300, payee 320 may define the payor rules 330 that payors 310 must satisfy in order to provide funds to funds pool 240 which is accessible by payee 320. As illustrated, three payors are present: payor 310-1, payor 310-2, and payor

TABLE 1

| Payee Name | Amount Available | Location Available | Payment Methods permitted | Timer Period Permitted | Number of Transactions Permitted | Frequency of transactions permitted |
|---|---|---|---|---|---|---|
| Payee 220-1 | 30% per transaction | U.S. Only | Any | Two weeks after funds provided by payor | 1 | One time only |
| Payee 220-2 | Maximum of $100 per transaction | Zip code 01852 | Agent locations, cash only | Jun. 13, 2010- Jul. 12, 2010 | unlimited | Once per week |
| Payee 220-n | Unlimited | Worldwide | Agent locations, bill payment only | Before Aug. 1, 2011 | 12 | Once per month |

A number of payees may be members of a group 222. In embodiment 200, payee 220-1 and payee 220-2 are members of group 222. Payor 210 may be able to set rules for a group, such as group 222, instead of setting individual rules for payee 220-1 and payee 220-2. For example, if payor 210 desires that the same rules apply to payee 220-1 and payee 220-2 but not payee 220-n, payor 210 may be able to assign payee 220-1 and payee 220-2 to group 222 and set the rules governing both payees 220-1 and 220-2 once. Additionally, other conditions may be set for a group. While payor 210 may not restrict the amount of funds payee 220-1 and payee 220-2 may receive, payor 210 may restrict the group 222 from receiving more than $100. In such an example, if payee 220-1 received $80 from money transfer server system 110, this may leave a maximum of $20 that may be received by 310-n. In other embodiments, two payors may be present, as may dozens of payors be present.

Embodiment 300 permits the reverse situation as embodiment 200: payee 320 may define payor rules 330 that payors 310 must satisfy in order to provide funds to payee 320 via funds pool 240. As opposed to having payor rules defined by payee 320, a third party may define payor rules 330. Payee 320 may provide biographical information and other transaction information to initiate the process, such as the payee's name, address, location, phone number, bank account number, etc.

Rules database 112 of money transfer server system 110 may comprise a set of payor rules 330. Payor rules 330 may define various restrictions defined by payee 320 (or some other authorized third party) that govern: 1) who may serve as a payor; 2) when each payor may receive funds; 3) how much funds each payor may provide; 4) how many times and/or how often a payor may provide funds, and/or other conditions. Payor rules 330 may be linked to the transaction initiated by payee 320 and funds supplied by payors 310.

Referring to point one, payee 320 may restrict who may serve as payors 310 via payor rules 330. This may involve payee 320 providing names, addresses, phone numbers, user names, etc., of payors 310. The payee may also provide as a payor rule that if a particular party provides funds as a payor, some other party may not serve as a payor. Such an arrangement may be useful if payee 320 wishes to receive an amount of money from a family, and wishes to allow several members of the family to be able to provide the money, but not if someone in the family has already provided some or all of the funds.

Referring to point two, payee 320 may define rules that define when each payor specified in point one may provide funds. These payor rules 330 may involve payee 320 selecting a range of dates and/or times that permit one or more payors to provide funds. Another payor rule that payee 320 may set is that a payor is only permitted to provide funds after some other predetermined condition has occurred, such as: some other payor has (or has not) provided funds and a certain amount of funds of the funds pool 240 has (or has not) been provided by payors.

Referring to point three, payee 320 may define payor rules 330 that define how much funds each payor of payors 310 or payors 310 collectively are required to provide. Payee 320 may specify fixed maximum and/or minimum amounts that payors 310 are required to provide. Payee 320 may also specify percentages that identify amounts of the funds that must be provided by each payor of payors 310 to funds pool 240. For example, a payee may specify that $90 is to be provided in total and specify that each payor of payors 310 must provide 33.33%. Therefore, each payor of payors 310 must provide roughly $30. Alternatively, payee 320 may specify a different percentage for each payor of payors 310. For example, payee 320 may define a payor rule that states that payor 310-1 is to provide 60%, payor 310-2 is to provide 30%, and payor 310-n is to provide 10%. Of course, this may be contingent on each payor agreeing to the request from payee 320 and actually providing those funds. Alternatively, the payor may preauthorize transactions to payee 320 and provide some amount of funds to money transfer server system 110 that may automatically provide funds to payee 320 in accordance with payor rules 330.

Referring to point four, payee 320 may also define how many times and/or how often a payor of payors 310 is permitted to provide funds. If payee 320 requests an amount of funds from payors 310, this amount of funds may remain with money transfer server system 110 until all of the funds provided by payors 310 has been received from the payors 310. If a payor of payors 310 does not provide funds within a period of time, the transaction may be declared void, and each payor receives all or a portion of her funds back. Payee 320 may specify that payors 310 or particular payors are not permitted to provide funds more (or less) often than some time period, such as once per week. If a payor violates the rule, he may be barred from providing future funds or other transaction may be voided, such as other payors of payors 310 may receive the funds they provided back. This may be particularly useful if the payors had each agreed to provide funds to the payee as long as each payor fulfilled his obligation, but one payor did not satisfy his obligation.

Payee 320 may also restrict the geographic location in which a payor may provide funds and/or the method through which a payor may provide funds. For example, payor rules 230 may prevent payors from providing funds using a credit card. Payor 210 may be able to define specific agent locations payee must receive funds at. Payor 210 may also restrict the payment method used by payees 220. For example, payor 210 may require that payees 220 receive funds directly into a bank account, or in cash at an agent location. Payor 210 may also specify that the funds received by payees be used directly for bill payment transactions through money transfer server system 110.

As should be understood by those with skill in the art, payor rules 330 may be set by payee 320 to apply to all of payors 320 or to individual payors of payors 310. Further, while the above discussed payee 320 sets payor rules 330, it should be understood that payee 320 may delegate payor rules 330 to be set by some third party or a payor. Table 2 illustrates an example of a set of payor rules 330 payee 320 may set to govern how payors 310 may provide funds.

TABLE 2

| Payor Name | Amount to be provided | Locations allowable | Payment Methods permitted | Time Period Permitted | Number of Transactions Permitted | Frequency of transactions permitted |
|---|---|---|---|---|---|---|
| Payor 310-1 | Minimum of $500 | Worldwide | Any | Anytime | 1 | One time only |
| Payor 310-2 | Maximum of $1000 | U.S. Only | Agent locations, cash only | Jun. 13, 2010-Jul. 12, 2010 | unlimited | Once per week |
| Payor 310-n | Double amount provided by Payor 310-1 | Zip code: 80304 | Website only, direct from a bank account | Before Aug. 1, 2010 | 12 | Once per day |

The payor rules of Table 2 may also include a restriction that if the total amount received by payors 310 is not greater than a certain amount by a certain date, each payor receives his funds back. Or, as another example, if one of the payors 310 fails to satisfy the payor rules and provide a payment by a certain time, the entire transaction may be voided and each payor may receive some or all of his funds back. A fee may be retained by the money transfer service provider operating money transfer server system 110 regardless of the outcome of the transaction, or only if it is successfully completed to the payee.

Further, a number of payors may be members of a group 312. In embodiment 300, payor 310-1 and payor 310-2 are members of group 312. Payee 320 may be able to set rules for a group, such as group 312, instead of setting individual rules for payor 310-1 and payor 310-2. For example, if payee 320 desires that the same rules apply to payor 310-1 and payor 310-2 but not payor 310-n, payee 320 may be able to assign payor 310-1 and payor 310-2 to group 312 and set the rules governing both payors 310-1 and 310-2 once. Additionally, other conditions may be set for a group. While payee 320 may not restrict the amount of funds payor 310-1 and payor 210-2 may provide, payee 320 may restrict the group 312 from providing less than $100. In such an example, if payor 310-1 provides $40 to money transfer server system 110, this may leave a minimum amount of $60 that payor 310-2 is permitted to provide because of the limit set on group 312. Payor 310-n, because he is not a member of group 312, may not be subject to the limit imposed on group 312.

Moreover, payor rules 330 may apply to one or more amounts of funds provided to payee 320. Payee 320 may set up payor rules 330 to apply to a first amount of funds that payee 320 wishes to receive from payors 310. After some or all of the funds have been received from payors 310, payor rules 330 may be retained for use as a template for future transactions to payee 320 from the same or some other payors. This may allow payee 320 at some future time to request additional funds and to specify that payor rules 330 again apply. As should be understood, using any of the access methods discussed in relation to FIG. 1 (agent locations 120, websites 140, telephone operator and/or IVR system, and/or mobile devices 160), payee 320 may create and/or modify payee rules 230.

If a payor of payors 310 attempts to provide funds using money transfer server system 110 and the payor's request satisfies all applicable payor rules 330, the payee may receive the funds. If the payor's request does not satisfy all applicable payor rules 330, the payor may be informed of what rule was not satisfied. Alternatively, payee 320 may desire some or all payee rules 330 to remain secret. As such, the payor may not be made aware as to why her request to provide funds did not satisfy payor rules 330.

Also, of note, various payors and payees may conduct transactions using different currencies. The money transfer system may be able to receive funds in a variety of different currencies, convert the currency received from the payor to a currency desired by one or more payors using an exchange rate. Further, a payee may request and receive funds in a different currency from another payee.

Figure 4:
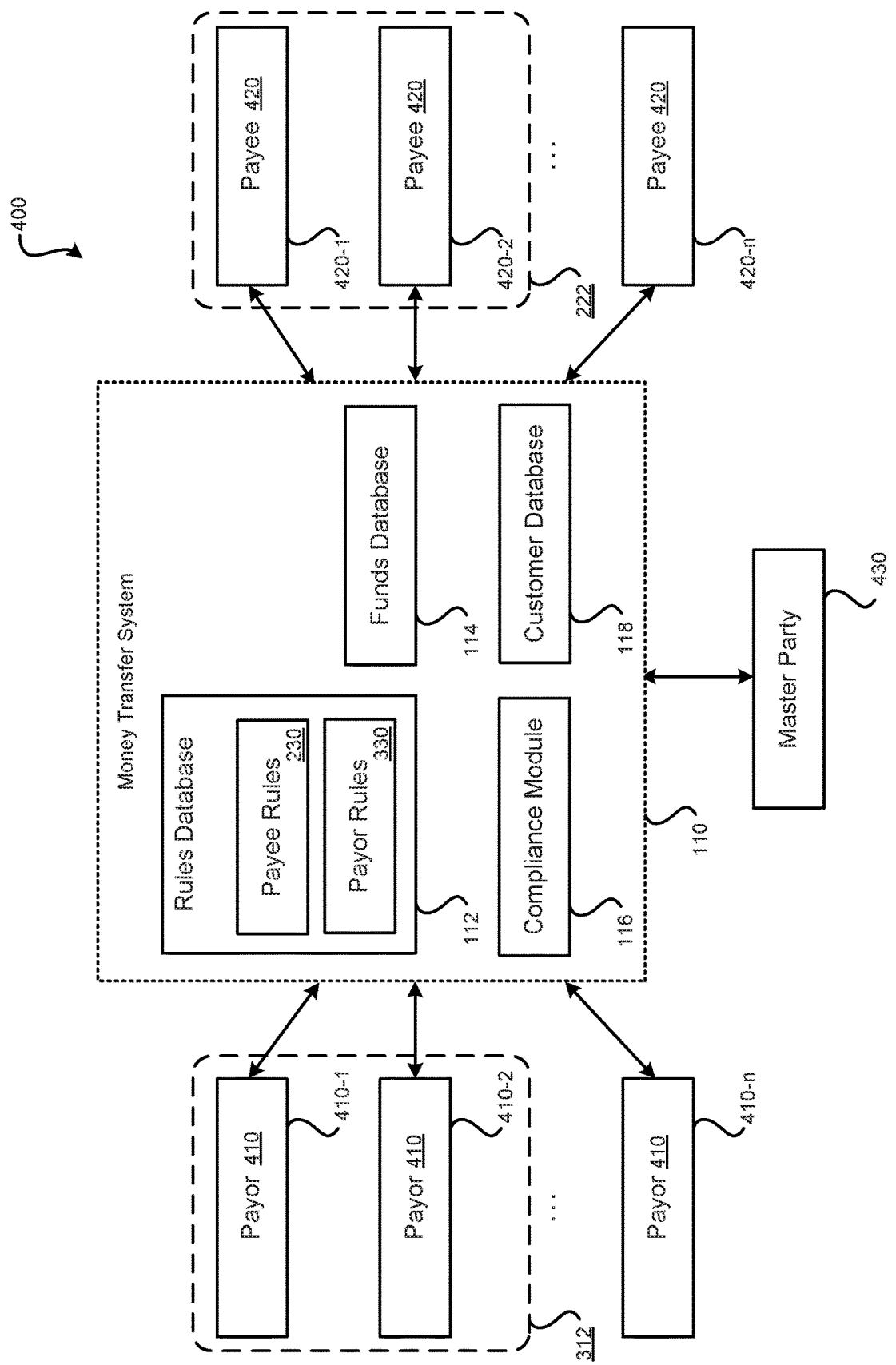
FIG. 4 illustrates a simplified block diagram of an embodiment of a many-to-many money transfer system.

FIG. 4 represents an embodiment where multiple payors and multiple payees are present. In embodiment 400, both payor rules 330 and payee rules 230 may be present. Both the payor rules 330 and payee rules 230 may be set by a master party 430. Master party 430 may be a payor of payors 410 (e.g. payor 410-1, payor 410-2, . . . , payor 410-n), a payee of payees 420 (e.g., payee 420-1, payee 420-2, . . . payee 420-n), or a third party. Alternatively, a payor of payors 410 may set payor rules 330 or payee rules 230, while a payee of payees 420 set the payee rules 230 or payor rules 330. Master party 430 may delegate to a payor or payee the right to create and/or modify the payor rules 330 and/or payee rules 230. Therefore, embodiment 400 may include some or all of the previously described payor rules 330 and/or payee rules 230. As such, rules may govern both the providing of, and receiving of, funds involved in a transaction conducted using embodiment 400.

Figure 5:
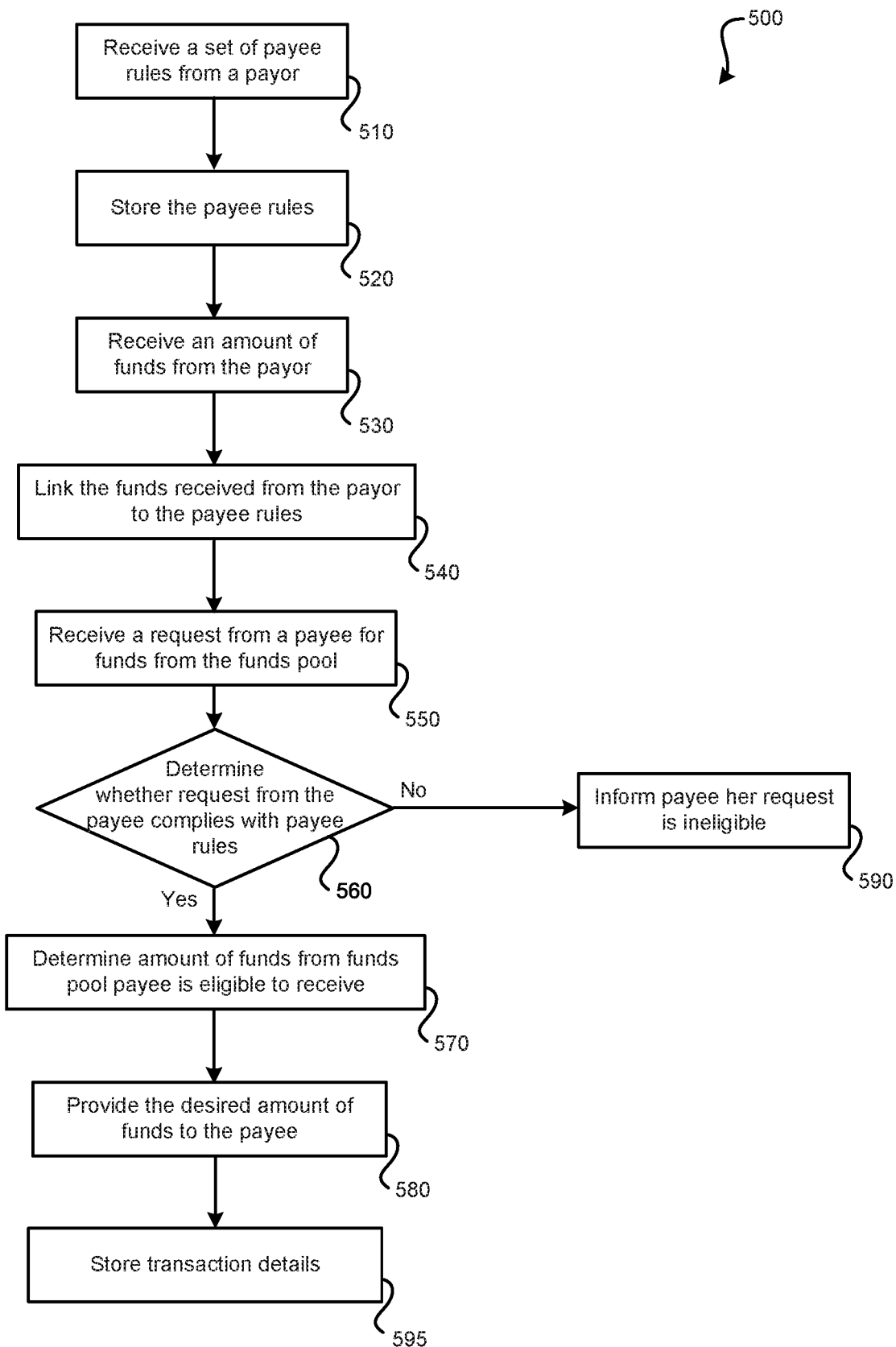
FIG. 5 illustrates an embodiment of a method for a one-to-many money transfer.

Returning to the one payor to multiple payees arrangement, a method such as method 500 of FIG. 5 may be used. Method 500 may be use in conjunction with a system such as that presented in embodiment 200 of FIG. 2. Alternatively, some other system may used to conduct method 500. At block 510, a set of payee rules (that governs how funds are received by multiple payees) may be provide by a payor. These payee rules may be the same or similar to the various payee rules discussed in relation to embodiment 200. The payor may provide such payee rules at an agent location, via a website of the money transfer service provider, over the phone to a telephone operator and/or IVR system, and/or from a mobile device. This may involve the payor enrolling in a program offered by the money transfer service provider to be able to specify the payee rules. In some embodiments, it may not be necessary for the payor to enroll with the money transfer service provider. In addition to a set of payee rules, the payor may provide his biographical information. This information about the payor, such as his name, address, phone number, etc., may be necessary for each money transfer. Conducting a one-to-many transfer may save the payor from repeatedly providing the same biographical information.

At block 520, the payee rules may be stored by the money transfer service provider, possibly at a money transfer server system, such as that presented in FIG. 1. These payee rules may be maintained until an associated transaction has been completed, or indefinitely to allow a payor to reuse the same payee rules for future money transfer transactions. It may be possible for the payor to have multiple sets of stored payee rules. For example, a payor may conduct multiple transactions with different payees and may use a different set of payee rules for each set of payees.

At block 530, the payor may provide an amount of funds that is to be transferred to the payees, assuming the payee rules are satisfied. These funds may be placed in a funds pool. The funds pool may contain funds previously provided by the payor. For example, not all of the funds provided by a payor for a previous transaction may have been distributed to payees. Therefore, this amount of funds may remain accessible to the payor to distribute. The funds received from the payor may be received at an agent location, via a website of the money transfer service provider, over the phone to a telephone operator and/or IVR system, or from a mobile device. The payor may use cash, credit card, check, money order, gift card, stored value card, debit card, or some other payment method to provide the funds to the money transfer service provider.

At block 540, the funds received from the payor may be linked to the payee rules created by the payor. This may involve the payor selecting the previously created set of payee rules stored at block 520.

At block 550, a request from a payee for an amount of funds may be received. The payee may have been informed of the presence of funds by the payor, or may have received a notification from the money transfer service provider, such as via email, phone, mail, etc. The request received from the payee may or may not include an amount requested.

At block 560, it may be determined whether the request from the payee complies with the payee rules established by the payor. If the request does not, the payee may be informed that her request was ineligible at block 590. This may include informing the payee why her request was denied, such as, what payee rule was not satisfied by her request. The payee may then be presented with a corrective action to make her request allowable. For example, this may require the payee to decrease the amount of funds she is requesting. Alternatively, if at block 560, the request from the payee complies with the payee rules established by the payor, the payment to the payee may proceed. If the payee was required to request a specific amount, this amount may also be evaluated at block 560. If not, at block 570, it may be determined what the maximum amount of funds available to the payee is at that time. In some embodiments, the maximum amount of funds available to the payee may automatically be provided. In other embodiments, the payee may be permitted to specify an amount of funds desired, up to the maximum available amount.

At block 580, the (desired) amount of funds may be provided to the payee. The method of payment to the payee may be based on a selection of payment methods included in the request from the payee received at block 550. Alternatively, the payee may be forced to accept the funds via a particular method specified by the payor.

At block 595, the details of the transaction with the payee are stored. These transaction details may be used to evaluate whether other payees are now eligible or not eligible to receive funds because the payee has received a certain amount of funds.

If another payee requests funds, the method may return to block 550 and evaluate the request for this other payee. The transaction details of the first transaction received at block 580 may be used in conjunction with the payee rules to determine whether the second request complies with the payee rules. As those with skill in the art will recognize, various numbers of payees may be used in conjunction with method 500.

Figure 6:
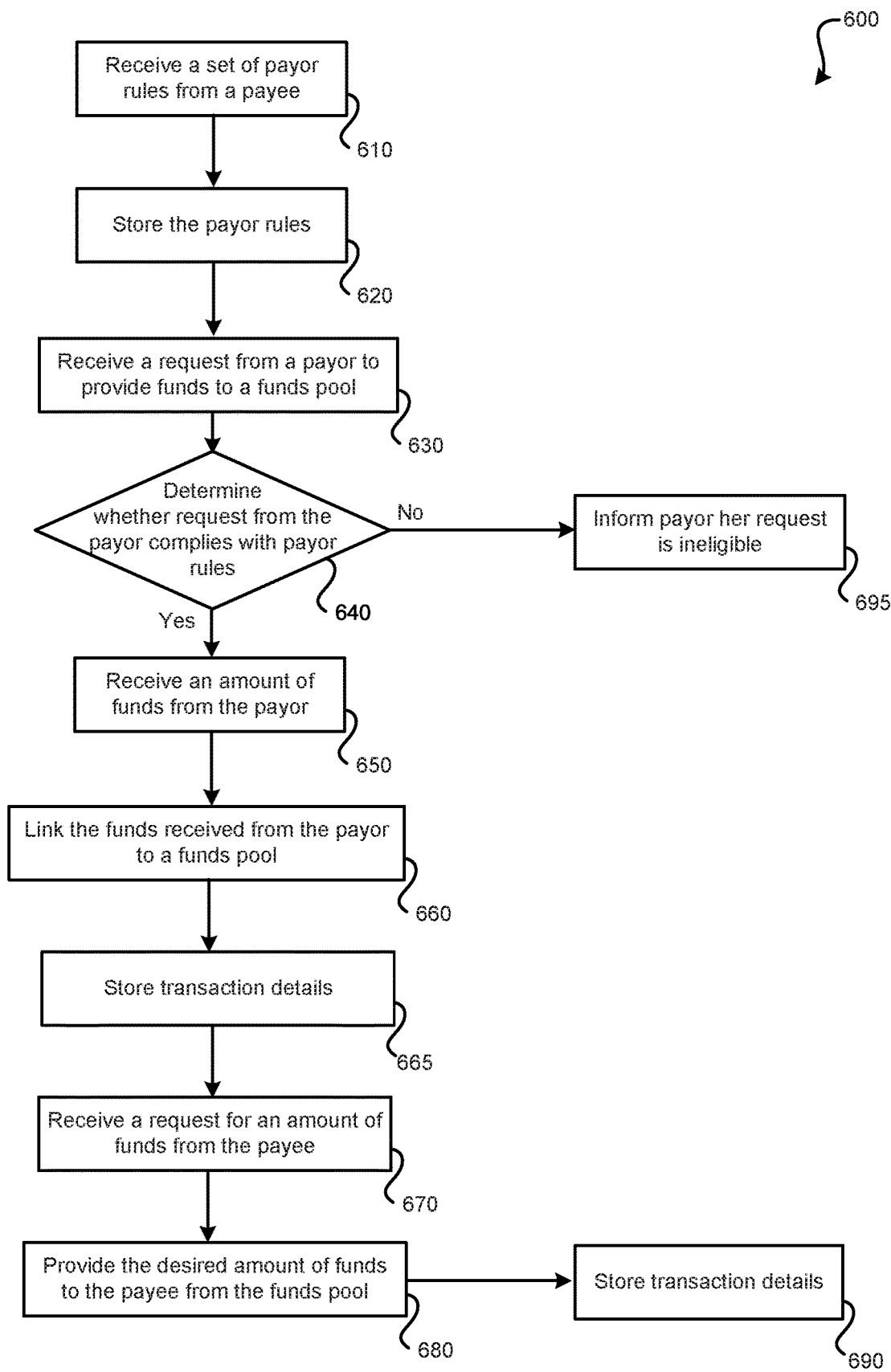
FIG. 6 illustrates an embodiment of a method for a many-to-one money transfer.

In a multiple payor to one payee arrangement, a method such as method 600 of FIG. 6 may be used. Method 600 may be used in conjunction with a system such as that presented in embodiment 300 of FIG. 3. Alternatively, some other system may be used to conduct method 600. At block 610, a set of payor rules (that governs how funds are provided by multiple payors) may be provided by a payee (or some other party, such as a third party or payor). These payor rules may be the same or similar to the various payor rules discussed in relation to embodiment 300. The payee may provide such payor rules at an agent location, via a website of the money transfer service provider, over the phone to a telephone operator and/or IVR system, and/or from a mobile device. This may involve the payee enrolling in a program offered by the money transfer service provider to be able to specify the payor rules. In some embodiments, it may not be necessary for the payee to enroll with the money transfer service provider.

At block 620, the payor rules may be stored by the money transfer service provider, possibly at a money transfer server system. These payor rules may be maintained until an associated transaction has been completed, or indefinitely to allow a payee to reuse the same payor rules for future money transfer transactions. It may be possible for the payee to have multiple sets of stored payor rules. For example, a payee may conduct multiple transactions with different payors and may use a different set of payor rules for each set of payors.

At block 630, a request from a payor to provide an amount of funds to a funds pool may be received. The payor may have been informed of the desire for funds by the payee, or may have received a notification from the money transfer service provider, such as via email, phone, mail, etc. The request received from the payor may or may not include an amount desired to be provided.

At block 640, it may be determined whether the request from the payor complies with the payor rules established by the payee. If the request does not, the payor may be informed that her request was ineligible at block 695. This may include informing the payor why her request was denied, such as, what payor rule was not satisfied by her request. The payor may then be presented with a corrective action to make her request allowable. For example, this may require the payor to increase the amount of funds she is requesting to provide. Alternatively, if at block 640, the request from the payor complies with the payor rules established by the payee, the payment to the payee may proceed.

At block 650, the payor may provide an amount of funds that is to be transferred to the payees, assuming the payor rules are satisfied. These funds may be placed in the funds pool. The funds pool may contain funds previously provided by the payor or other payors. The funds received from the payor may be received at an agent location, via a website of the money transfer service provider, over the phone to a telephone operator and/or IVR system, or from a mobile device. The payor may use cash, credit card, check, money order, gift card, stored value card, debit card, or some other payment method to provide the funds to the money transfer service provider, assuming the selected payment method is in accordance with the payor rules defined by the payee. At block 660, the funds received from the payor may be linked to the funds pool created to hold funds received from the various payors for the payee.

At block 665, details of the transaction between the payor and the money transfer service provider may be stored. These details may be used to in conjunction with the payor rules to evaluate whether some other payor is permitted to provide an amount of funds. If another payor requests to provide funds, the method may return to block 630 and evaluate the request for this other payor. As those with skill in the art will recognize, various numbers of payors may be used in conjunction with method 600.

At block 670, the payee may attempt to retrieve funds from the funds pool. The payee may be prevented from retrieving funds from the funds pool unless certain criteria have been satisfied. For example, the payee (or some third party) may have specified that he cannot retrieve funds until all payors have contributed or some minimum amounts of funds are present. If these conditions are not satisfied, the request may be denied. At block 680, the desired amount of funds may be provided to the payee. The method of payment to the payee may be based on a selection of payment methods included in the request from the payee received at block 670.

At block 690, the details of the transaction with the payee may be stored. Some or all of these transaction details may be provided to the payor as proof that their funds were received by the payee.

Figure 7A:
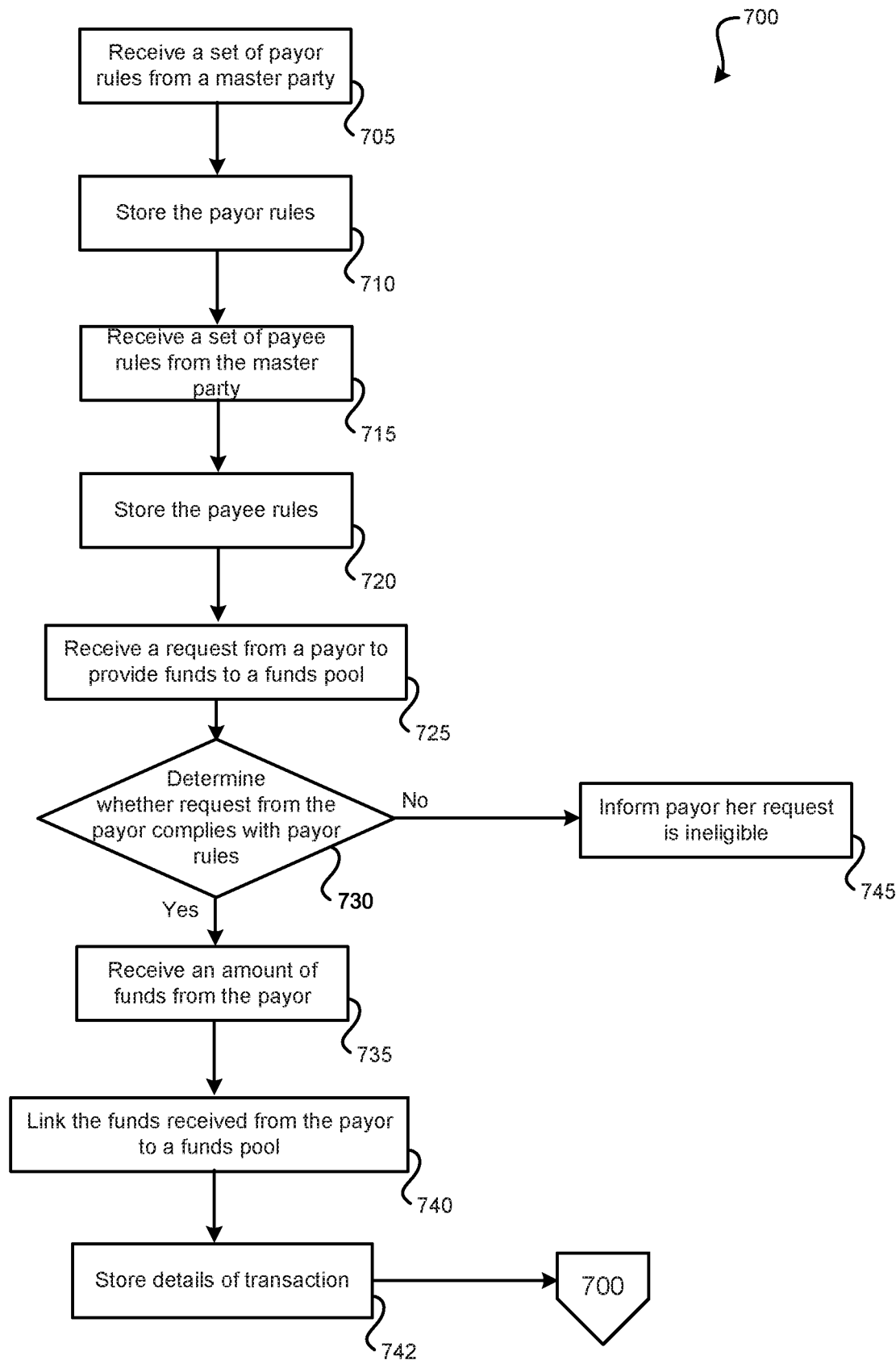
FIGS. 7A and 7B illustrate an embodiment of a method for a many-to-many money transfer.
Figure 7B:
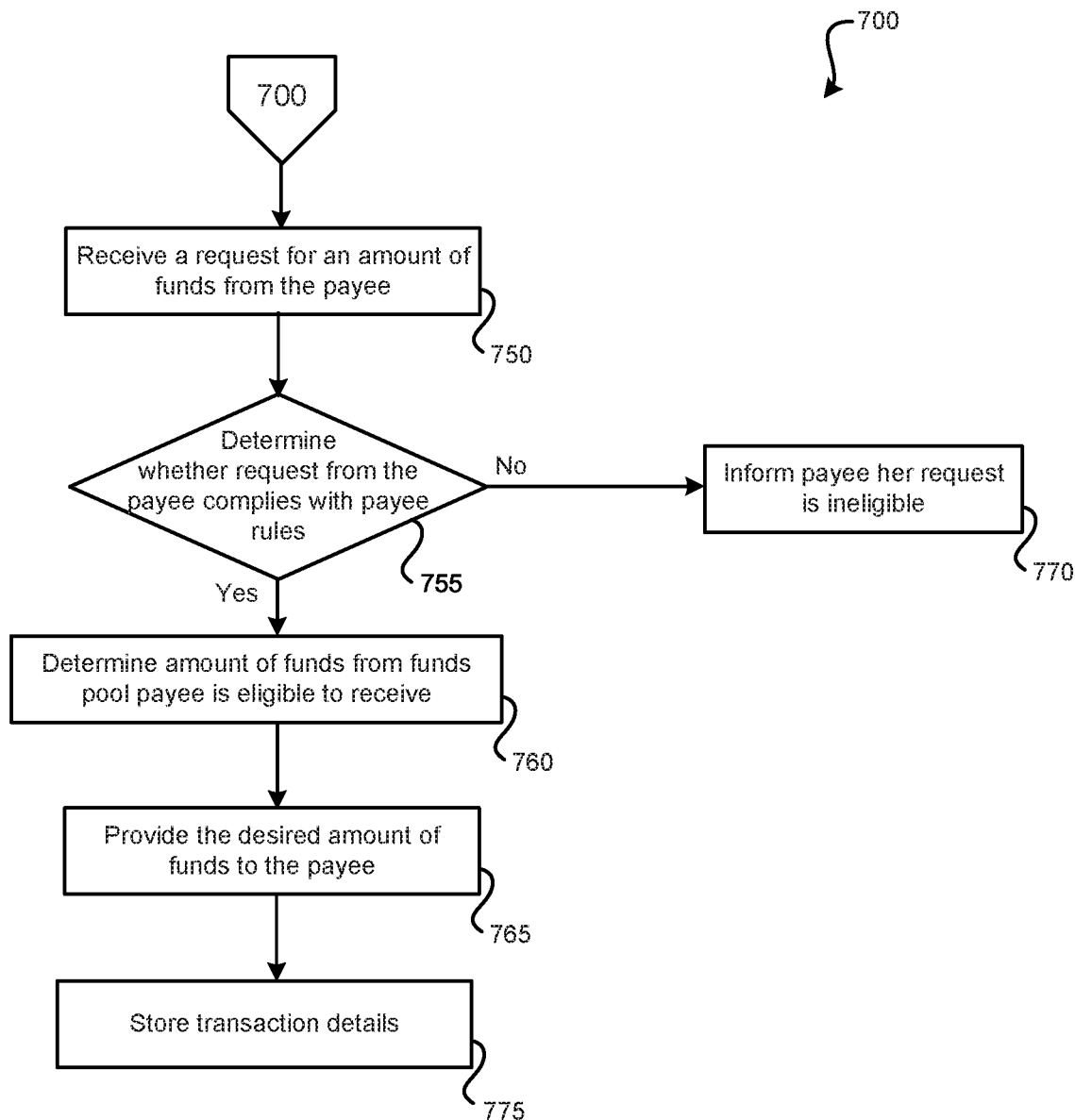

A method such as method 700 of FIGS. 7A and 7B may be used when multiple payors desire to transmit funds to multiple payees. Method 700 may be used in conjunction with a system such as that presented in embodiment 400 of FIG. 4. Alternatively, some other system may used to conduct method 700.

Referring to FIG. 7A, at block 705, a set of payor rules (that governs how funds are provided by multiple payors) may be provide by a master party. These payor rules may be the same or similar to the various payor rules discussed in relation to embodiment 300 or embodiment 400. The master party may provide such payor rules at an agent location, via a website of the money transfer service provider, over the phone to a telephone operator and/or IVR system, and/or from a mobile device. This may involve the master party enrolling in a program offered by the money transfer service provider to be able to specify the payor rules. In some embodiments, it may not be necessary for the master party to enroll with the money transfer service provider.

At block 710, the payor rules may be stored by the money transfer service provider, possibly at a money transfer server system. These payor rules may be maintained until an associated transaction has been completed, or indefinitely to allow the master party to reuse the same payor rules for future money transfer transactions. It may be possible for the master party to have multiple sets of stored payor rules. For example, a master party may conduct multiple transactions with different payors and may use a different set of payor rules for each set of payors.

At block 715, a set of payee rules (that governs how funds are received by multiple payees) may be provide by a master party. These payee rules may be the same or similar to the various payee rules discussed in relation to embodiments 200 and 400. The master party may provide such payee rules at an agent location, via a website of the money transfer service provider, over the phone to a telephone operator and/or IVR system, and/or from a mobile device. This may involve the master party enrolling in a program offered by the money transfer service provider to be able to specify the payee rules. In some embodiments, it may not be necessary for the master party to enroll with the money transfer service provider.

At block 720, the payee rules may be stored by the money transfer service provider, possibly at a money transfer server system. These payee rules may be maintained until an associated transaction has been completed, or indefinitely to allow the master party to reuse the same payee rules for future money transfer transactions. It may be possible for the master party to have multiple sets of stored payee rules. For example, a master party may conduct (or manage) multiple transactions with different payees and different payors and may use a different set of payee rules for each set of payees.

The master party of blocks 705 through 720 may be a payor, a payee, or a third party. Alternatively, the master party may be several parties. For example, a payor may establish the payee rules, and a payee may establish the payor rules. One payor of the payors may be the master payor that is designated to establish the payee rules. Likewise one payee of the payees may be the master payee that is designated to establish the payor rules. In some embodiments, the payors or a master payor establishes the payor rules. In some embodiments, the payees or a master payee establishes the payee rules. Other permutations are possible.

At block 725, a request from a payor to provide an amount of funds to a funds pool may be received. The payor may have been informed of the desire for funds by the payee, or may have received a notification from the money transfer service provider, such as via email, phone, mail, etc. The request received from the payor may or may not include an amount desired to be provided.

At block 730, it may be determined whether the request from the payor complies with the payor rules established by the payee. If the request does not, the payor may be informed that her request was ineligible at block 745. This may include informing the payor why her request was denied, such as, what payor rule was not satisfied by her request. The payor may then be presented with a corrective action to make her request allowable. For example, this may require the payor to increase the amount of funds she is requesting to provide. Alternatively, if at block 730, the request from the payor complies with the payor rules established by the payee, the payment to the payee may proceed.

At block 735, the payor may provide an amount of funds that is to be transferred to the payees, assuming the payor rules are satisfied. These funds may be placed in the funds pool. The funds pool may contain funds previously provided by the payor or other payors. The funds received from the payor may be received at an agent location, via a website of the money transfer service provider, over the phone to a telephone operator and/or IVR system, or from a mobile device. The payor may use cash, credit card, check, money order, gift card, stored value card, debit card, or some other payment method to provide the funds to the money transfer service provider, assuming the selected payment method is in accordance with the payor rules defined by the master party. At block 740, the funds received from the payor may be linked to the funds pool created to hold funds received from the various payors for the payee.

At block 742, details of the transaction between the payor and the money transfer service provider may be stored. These details may be used to in conjunction with the payor rules to evaluate whether some other payor is permitted to provide an amount of funds. If another payor requests to provide funds, the method may return to block 725 and evaluate the request for this other payor. As those with skill in the art will recognize, various numbers of payors may be used in conjunction with method 700. Method 700 continues on FIG. 7B.

At block 750, a request from a payee for an amount of funds may be received. The payee may have been informed of the presence of funds by the payor, or may have received a notification from the money transfer service provider, such as via email, phone, mail, etc. The request received from the payee may or may not include an amount requested.

At block 755, it may be determined whether the request from the payee complies with the payee rules established by the master party. If the request does not, the payee may be informed that her request was ineligible at block 770. This may include informing the payee why her request was denied, such as, what payee rule was not satisfied by her request. The payee may then be presented with a corrective action to make her request allowable. For example, this may require the payee to decrease the amount of funds she is requesting. Alternatively, if at block 755, the request from the payee complies with the payee rules established by the master party, the payment to the payee may proceed. If the payee was required to request a specific amount, this amount may also be evaluated at block 755. If not, at block 760, it may be determined what the maximum amount of funds available to the payee is at that time. In some embodiments, the maximum amount of funds available to the payee may automatically be provided. In other embodiments, the payee may be permitted to specify an amount of funds desired, up to the maximum available amount.

At block 765, the (desired) amount of funds may be provided to the payee. The method of payment to the payee may be based on a selection of payment methods included in the request from the payee received at block 750. Alternatively, the payee may be forced to accept the funds via a particular method specified by the master party.

At block 775, the details of the transaction with the payee are stored. These transaction details may be used to evaluate whether other payees are now eligible or not eligible to receive funds because the payee has received a certain amount of funds.

If another payee requests funds, the method may return to block 750 and evaluate the request for this other payee. The transaction details stored at block 775 may be used in conjunction with the payee rules to determine whether the second request complies with the payee rules. As those with skill in the art will recognize, various numbers of payees may be used in conjunction with method 500. Further, it should be understood that in method 700 one or more payors may provide funds after a payee has received funds.

Figure 8:
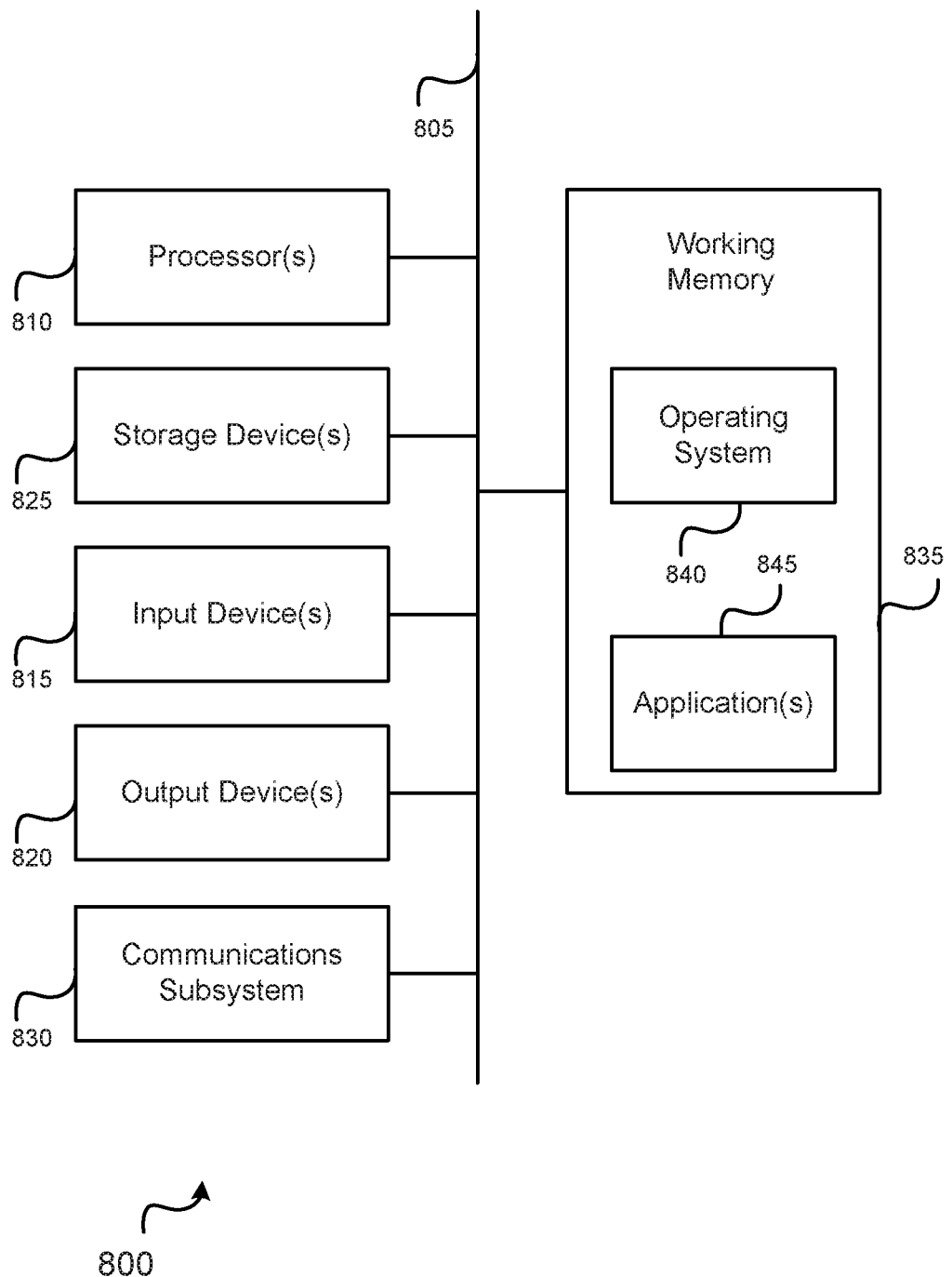
FIG. 8 illustrates an embodiment of a computer system.

To perform the actions of the money transfer server system, the kiosks and/or any of the other previously mentioned computing devices, a computer system as illustrated in FIG. 8 may be used. FIG. 8 provides a schematic illustration of one embodiment of a computer system 800 that can perform the methods provided by various other embodiments, as described herein, and/or can function as the host computer system, a remote kiosk/terminal, a point-of-sale device, a mobile device, and/or a computer system. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like.

The computer system 800 may further include (and/or be in communication with) one or more storage devices 825, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as the system 800. In other embodiments, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 825. Volatile media include, without limitation, dynamic memory, such as the working memory 835. Transmission media include, without limitation, coaxial cables, copper wire and fiber optics, including the wires that comprise the bus 805, as well as the various components of the communication subsystem 830 (and/or the media by which the communications subsystem 830 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A money transfer system for performing a plurality of money transfers between a plurality of payors and a plurality of payees, the money transfer system comprising:
   a processing unit including one or more processors;
   a storage device storing a rules database which includes a set of payee rules and a set of payor rules; and
   a memory communicatively connected with and readable by the processing unit, the memory containing instructions that, when executed by the processing unit, cause the processing unit to:
      store, in the rules database, a set of payee rules received from a master party, wherein the set of payee rules identifies a plurality of payees, conditions in which a payee of the plurality of payees is permitted to receive funds from a funds pool, and conditions that define an amount of funds that the payee of the plurality of payees is permitted to receive from the funds pool;
      store, in the rules database, a set of payor rules from the master party, wherein the set of payor rules identifies a plurality of payors, and conditions in which a payor of the plurality of payors is permitted to provide funds to the funds pool;
      receive, from a first payor computing device in communication with the processing unit, a first request associated with a first payor to provide a first amount of funds into the funds pool;
      determine whether or not that the first request complies with the set of payor rules by comparing a condition associated with the first payor in the rules database with a characteristic of the first request;
      in response to determining that the first request complies with a condition associated with the first payor in the rules database, initiate an electronic transfer of the first amount of funds from the first payor to the funds pool;
      receive, from a first payee computing device in communication with the processing unit, a second request associated with a first payee for a second amount of funds from the funds pool;
      determine whether or not the second request complies with the set of payee rules by comparing a condition associated with the first payee in the rules database with a characteristic of the second request; and
      in response to determining that the second request complies with the condition associated with the first payee in the rules database, initiate an electronic transfer of the second amount of funds to the first payee from the funds pool.

2. The money transfer system of claim 1, wherein the set of payee rules further comprises a rule that prevents the first payee from receiving funds from the funds pool until a minimum total of funds exists in the funds pool.

3. The money transfer system of claim 1, wherein the set of payee rules further comprises a rule that indicates a maximum or minimum amount of funds from the funds pool the first payee may withdraw.

4. The money transfer system of claim 1, wherein the set of payee rules further comprises a rule that indicates a retrieval method for retrieving funds from the funds pool.

5. The money transfer system of claim 1, wherein the set of payor rules further comprises a rule that indicates a maximum or minimum amount of funds the first payor may contribute to the funds pool.

6. The money transfer system of claim 1, wherein the set of payor rules further comprises a rule that indicates a payment method for contributing funds to the funds pool.

7. The money transfer system of claim 1, wherein the master party is distinct from the first payee and the first payor.

8. The money transfer system of claim 1, wherein the funds pool is associated with a store of value card, wherein a value of the store of value card is equal to the amount of funds in the funds pool.

9. A computer-implemented method for performing a plurality of money transfers between a plurality of payors and a plurality of payees, the computer-implemented method comprising:
  storing, in a rules database, a set of payee rules received from a master party, wherein the set of payee rules identifies a plurality of payees, conditions in which a payee of the plurality of payees is permitted to receive funds from a funds pool, and conditions that define an amount of funds that the payee of the plurality of payees is permitted to receive from the funds pool;
  storing, in the rules database, a set of payor rules from the master party, wherein the set of payor rules identifies a plurality of payors, and conditions in which a payor of the plurality of payors is permitted to provide funds to the funds pool;
  receiving, by a processing unit including one or more processors, from a first payor computing device in communication with the processing unit, a first request associated with a first payor to provide a first amount of funds into the funds pool;
  determining, by the processing unit, whether or not that the first request complies with the set of payor rules by comparing a condition associated with the first payor in the rules database with a characteristic of the first request;
  in response to determining that the first request complies with a condition associated with the first payor in the rules database, initiating, by the processing unit an electronic transfer of the first amount of funds from the first payor to the funds pool;
  receiving, by the processing unit, from a first payee computing device in communication with the processing unit, a second request associated with a first payee for a second amount of funds from the funds pool;
  determining, by the processing unit, whether or not the second request complies with the set of payee rules by comparing a condition associated with the first payee in the rules database with a characteristic of the second request; and
  in response to determining that the second request complies with the condition associated with the first payee in the rules database, initiating, by the processing unit, an electronic transfer of the second amount of funds to the first payee from the funds pool.

10. The computer-implemented method of claim 9, wherein the set of payee rules further comprises a rule that prevents the first payee from receiving funds from the funds pool until a minimum total of funds exists in the funds pool.

11. The computer-implemented method of claim 9, wherein the set of payee rules further comprises a rule that indicates a maximum or minimum amount of funds from the funds pool the first payee may withdraw.

12. The computer-implemented method of claim 9, wherein the set of payee rules further comprises a rule that indicates a retrieval method for retrieving funds from the funds pool.

13. The computer-implemented method of claim 9, wherein the set of payor rules further comprises a rule that indicates a maximum or minimum amount of funds the first payor may contribute to the funds pool.

14. The computer-implemented method of claim 9, wherein the set of payor rules further comprises a rule that indicates a payment method for contributing funds to the funds pool.

15. The computer-implemented method of claim 9, wherein the master party is distinct from the first payee and the first payor.

16. The computer-implemented method of claim 9, wherein the funds pool is associated with a store of value card, wherein a value of the store of value card is equal to the amount of funds in the funds pool.

17. A non-transitory, computer-readable storage medium having stored thereon instructions for causing at least one computer system to perform operations to facilitate a plurality of money transfers between a plurality of payors and a plurality of payees, the operations comprising:
  storing, in a rules database, a set of payee rules received from a master party, wherein the set of payee rules identifies a plurality of payees, conditions in which a payee of the plurality of payees is permitted to receive funds from a funds pool, and conditions that define an amount of funds that the payee of the plurality of payees is permitted to receive from the funds pool;
  storing, in the rules database, a set of payor rules from the master party, wherein the set of payor rules identifies a plurality of payors, and conditions in which a payor of the plurality of payors is permitted to provide funds to the funds pool;
  receiving, by a processing unit including one or more processors, from a first payor computing device in communication with the processing unit, a first request associated with a first payor to provide a first amount of funds into the funds pool;
  determining, by the processing unit, whether or not that the first request complies with the set of payor rules by comparing a condition associated with the first payor in the rules database with a characteristic of the first request;
  in response to determining that the first request complies with a condition associated with the first payor in the rules database, initiating, by the processing unit an electronic transfer of the first amount of funds from the first payor to the funds pool;
  receiving, by the processing unit, from a first payee computing device in communication with the processing unit, a second request associated with a first payee for a second amount of funds from the funds pool;
  determining, by the processing unit, whether or not the second request complies with the set of payee rules by comparing a condition associated with the first payee in the rules database with a characteristic of the second request; and in response to determining that the second request complies with the condition associated with the first payee in the rules database, initiating, by the processing unit, an electronic transfer of the second amount of funds to the first payee from the funds pool.

18. The non-transitory, computer-readable storage medium of claim 17, wherein the set of payor rules further comprises a rule that indicates a payment method for contributing funds to the funds pool.

19. The non-transitory, computer-readable storage medium of claim 17, wherein the master party is distinct from the first payee and the first payor.

20. The non-transitory, computer-readable storage medium of claim 17, wherein the funds pool is associated with a store of value card, wherein a value of the store of value card is equal to the amount of funds in the funds pool.

* * * * *